US011188371B2

(12) United States Patent
Moradi et al.

(10) Patent No.: US 11,188,371 B2
(45) Date of Patent: Nov. 30, 2021

(54) MONITORING CONTROLLER AND A METHOD PERFORMED THEREBY FOR MONITORING NETWORK PERFORMANCE

(71) Applicant: Telefonaktiebolaget LM Ericsson (publ), Stockholm (SE)

(72) Inventors: Farnaz Moradi, Stockholm (SE); Christofer Flinta, Stockholm (SE); Catalin Meirosu, Solna (SE); Andreas Johnsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 16/300,530

(22) PCT Filed: May 12, 2016

(86) PCT No.: PCT/SE2016/050430
§ 371 (c)(1),
(2) Date: Nov. 9, 2018

(87) PCT Pub. No.: WO2017/196216
PCT Pub. Date: Nov. 16, 2017

(65) Prior Publication Data
US 2020/0310846 A1      Oct. 1, 2020

(51) Int. Cl.
*G06F 9/455*      (2018.01)
*H04L 12/26*      (2006.01)

(52) U.S. Cl.
CPC ......... *G06F 9/45558* (2013.01); *H04L 43/10* (2013.01); *H04L 43/12* (2013.01);
(Continued)

(58) Field of Classification Search
CPC ......... H04L 43/08; H04L 43/10; H04L 43/12; H04L 43/14; H04L 43/18; H04L 43/50;
(Continued)

(56) References Cited

U.S. PATENT DOCUMENTS 6,363,056 B1      3/2002  Beigi et al.
6,493,755 B1 *   12/2002  Hanson ............... H04L 41/0609
                                                              709/224
(Continued)

FOREIGN PATENT DOCUMENTS

CN      104813699 A      7/2015
CN      105052074 A     11/2015
(Continued)

OTHER PUBLICATIONS

Croce D., et al., "Large-Scale Available Bandwidth Measurements: Interference in Current Techniques," IEEE Transactions on Network and Service Management, vol. 8 (4), Dec. 2011, pp. 361-374.
(Continued)

*Primary Examiner* — Kostas J Katsikis
(74) *Attorney, Agent, or Firm* — NDWE LLP

(57) ABSTRACT

A monitoring controller and a method for monitoring network performance are provided. The comprises determining, by a monitoring controller of a first host, a change in a communication between a first and a second application instance by observing application traffic exchanged between the first and second application instance, the first application instance being executed on the first host and the second application instance being executed on a second host. The method further comprises initiating, by the monitoring controller, a monitoring instance in the first host for exchanging test packets between the first host and the second host for monitoring network performance.

20 Claims, 8 Drawing Sheets

(52) U.S. Cl.
CPC .......... *G06F 2009/45591* (2013.01); *G06F 2009/45595* (2013.01)

(58) Field of Classification Search
CPC ....... G06F 9/45558; G06F 2009/45591; G06F 2009/45595; G06F 11/3003; G06F 11/3006; G06F 11/301
See application file for complete search history.

(56) References Cited

U.S. PATENT DOCUMENTS

| | | | |
|---|---|---|---|
| 6,560,648 B1 | 5/2003 | Dunn et al. | |
| 6,763,380 B1 | 7/2004 | Mayton et al. | |
| 7,636,321 B1 | 12/2009 | Iannaccone et al. | |
| 8,018,943 B1* | 9/2011 | Pleshek | H04L 49/90 370/392 |
| 8,098,677 B1* | 1/2012 | Pleshek | H04L 43/028 370/419 |
| 8,600,726 B1* | 12/2013 | Varshney | G06F 9/455 703/26 |
| 9,400,682 B2 | 7/2016 | Persikov et al. | |
| 9,658,937 B2 | 5/2017 | Christodorescu et al. | |
| 10,264,020 B1* | 4/2019 | Nanda | H04L 63/20 |
| 10,411,985 B1* | 9/2019 | Miller | H04L 43/06 |
| 2002/0120727 A1 | 8/2002 | Curley et al. | |
| 2002/0131369 A1 | 9/2002 | Hasegawa et al. | |
| 2002/0161755 A1 | 10/2002 | Moriarty | |
| 2006/0039538 A1* | 2/2006 | Minnis | H04B 17/3912 379/1.01 |
| 2006/0072466 A1* | 4/2006 | Wang | H04L 67/28 370/241 |
| 2006/0294439 A1 | 12/2006 | Rolia et al. | |
| 2007/0281623 A1 | 12/2007 | Liu | |
| 2009/0150996 A1* | 6/2009 | Haswell | G06F 21/554 726/22 |
| 2009/0172148 A1* | 7/2009 | Underwood | H04L 12/66 709/224 |
| 2011/0004698 A1* | 1/2011 | Wu | G06F 9/45558 709/235 |
| 2011/0055378 A1* | 3/2011 | Ferris | H04L 43/00 709/224 |
| 2012/0079107 A1* | 3/2012 | Williams | H04L 63/1433 709/224 |
| 2013/0006601 A1* | 1/2013 | Mlinarsky | H04W 24/06 703/23 |
| 2013/0031233 A1* | 1/2013 | Feng | G06F 9/06 709/223 |
| 2013/0036416 A1* | 2/2013 | Raju | H04L 41/0816 718/1 |
| 2013/0291109 A1* | 10/2013 | Staniford | G06F 9/45533 726/23 |
| 2014/0157407 A1* | 6/2014 | Krishnan | G06F 21/50 726/22 |
| 2014/0229605 A1* | 8/2014 | Besser | H04L 63/1416 709/224 |
| 2014/0289392 A1 | 9/2014 | Ur et al. | |
| 2014/0310377 A1* | 10/2014 | Matsuoka | H04L 41/065 709/217 |
| 2014/0317293 A1* | 10/2014 | Shatzkamer | G06F 9/45558 709/226 |
| 2014/0337674 A1* | 11/2014 | Ivancic | H04L 43/50 714/43 |
| 2014/0351414 A1 | 11/2014 | Rosensweig et al. | |
| 2015/0044973 A1 | 2/2015 | Siomina | |
| 2015/0244617 A1* | 8/2015 | Nakil | H04L 41/0631 709/224 |
| 2015/0263889 A1* | 9/2015 | Newton | H04L 47/10 370/254 |
| 2015/0319030 A1* | 11/2015 | Nachum | H04L 43/00 370/250 |
| 2015/0326457 A1* | 11/2015 | Wu | H04L 43/0817 370/252 |
| 2015/0333993 A1 | 11/2015 | Welin et al. | |
| 2016/0014073 A1* | 1/2016 | Reddy | G06F 9/4416 713/2 |
| 2016/0026789 A1* | 1/2016 | Martini | G06F 9/45558 718/1 |
| 2016/0048407 A1* | 2/2016 | Alicherry | H04L 41/5096 718/1 |
| 2016/0087861 A1* | 3/2016 | Kuan | H04L 43/065 709/224 |
| 2016/0094418 A1* | 3/2016 | Raney | H04L 43/12 370/241 |
| 2016/0099853 A1 | 4/2016 | Nedeltchev et al. | |
| 2016/0110211 A1* | 4/2016 | Karnes | H04L 43/12 718/1 |
| 2016/0149788 A1* | 5/2016 | Zhang | H04L 41/0843 709/224 |
| 2016/0226726 A1* | 8/2016 | Rao | H04L 43/028 |
| 2016/0274991 A1 | 9/2016 | Christodorescu et al. | |
| 2016/0277249 A1* | 9/2016 | Singh | H04L 43/12 |
| 2016/0283307 A1* | 9/2016 | Takeshima | G06F 11/0709 |
| 2016/0357424 A1* | 12/2016 | Pang | G06F 16/235 |
| 2016/0357957 A1* | 12/2016 | Deen | H04L 41/0668 |
| 2016/0359889 A1* | 12/2016 | Yadav | G06N 20/00 |
| 2016/0359913 A1* | 12/2016 | Gupta | H04L 43/0864 |
| 2016/0380865 A1* | 12/2016 | Dubal | H04L 43/14 709/224 |
| 2017/0041750 A1 | 2/2017 | Jose et al. | |
| 2017/0060628 A1* | 3/2017 | Tarasuk-Levin | G06F 9/45558 |
| 2017/0075710 A1* | 3/2017 | Prasad | H04L 43/026 |
| 2017/0078198 A1* | 3/2017 | Nellikar | H04L 41/12 |
| 2017/0099195 A1* | 4/2017 | Raney | H04L 41/046 |
| 2017/0111246 A1* | 4/2017 | Shaw | H04L 43/08 |
| 2017/0118102 A1* | 4/2017 | Majumder | H04L 43/0894 |
| 2017/0163510 A1* | 6/2017 | Arora | H04L 43/026 |
| 2017/0171159 A1* | 6/2017 | Kumar | H04L 63/0281 |
| 2018/0123928 A1* | 5/2018 | Moradi | H04L 43/0852 |
| 2018/0152369 A1 | 5/2018 | Mccallen et al. | |
| 2018/0167294 A1 | 6/2018 | Gupta et al. | |
| 2018/0176088 A1* | 6/2018 | Ellappan | H04L 41/0893 |
| 2020/0310846 A1* | 10/2020 | Moradi | H04L 43/12 |

FOREIGN PATENT DOCUMENTS

| | | | | |
|---|---|---|---|---|
| WO | WO-2015038604 A1 * | 3/2015 | ......... | G06F 9/45558 |
| WO | 2016/115406 A1 | 7/2016 | | |
| WO | WO-2019177890 A1 * | 9/2019 | ............ | H04L 43/12 |

OTHER PUBLICATIONS

Felter W., et al., "An Updated Performance Comparison of Virtual Machines and Linux Containers," IEEE, 2015, pp. 171-172.
Guo C., et al., "Pingmesh: A Large-Scale System for Data Center Network Latency Measurement and Analysis," SIGCOMM'15, Aug. 17-21, 2015, pp. 139-152.
Huang G., et al., "Measurement-Aware Monitor Placement and Routing: A Joint Optimization Approach for Network-Wide Measurements," IEEE Transactions on Network and Service Management, vol. 9 (1), Mar. 2012, pp. 48-59.
International Search Report and Written Opinion for Application No. PCT/SE2016/050430, dated Sep. 22, 2016, 13 pages.
RFC 5357: Hedayat K., et al., "A Two-Way Active Measurement Protocol (TWAMP)," Network Working Group, Request for Comments: 5357, Oct. 2008, 26 pages.
Xia M., et al., "Resource Optimization for Service Chain Monitoring in Software-Defined Networks," Fourth European Workshop on Software Defined Networks, 2015, pp. 91-96.
Yu Y., et al., "Distributed and Collaborative Traffic Monitoring in Software Defined Networks," HotSDN'14, Aug. 22, 2014, 6 pages.
Gangam et al., "Mitigating Interference in a Network Measurement Service", 2011 IEEE Nineteenth IEEE International Workshop on Quality of Service, IEEE, 2011, pp. 1-9.
International Preliminary Report on Patentability received for PCT Patent Application No. PCT/SE2016/050430, dated Nov. 22, 2018, 9 pages.
International Preliminary Report on Patentability received for PCT Patent Application No. PCT/SE2016/051319, dated Jul. 11, 2019, 8 pages.

(56) References Cited

OTHER PUBLICATIONS

International Search Report and Written Opinion for Application No. PCT/SE2016/050430, dated Sep. 22, 2016, 11 pages.
International Search Report and Written Opinion received for PCT Patent Application No. PCT/SE2016/051319, dated Oct. 10, 2017, 9 pages.
Tillenius et al., "Resource-Aware Task Scheduling", ACM Transactions on Embedded Computing Systems, vol. 14, No. 1, Article 5, Jan. 2015, 25 pages.
Zhang et al., "HELM: Conflict-Free Active Measurement Scheduling for Shared Network Resource Management", 2015 IFIP/IEEE International Symposium on Integrated Network Management (IM), May 2015, 9 pages.
Baillargeon et al., "Ericsson Two-Way Active Measurement Protocol (TWAMP) Value-Added Octets", Internet Engineering Task Force (IETF), Request for Comments: 6802, Nov. 2012, pp. 1-16.
Communication pursuant to Article 94(3) EPC for EP Application No. 16728417.3, dated Apr. 14, 2020, 5 pages.
Duche et al., "Round Trip Delay Time as a Linear Function of Distance Between the Sensor Nodes in Wireless Sensor Network", International Journal of Engineering Sciences & Emerging Technologies, vol. 1, Issue 2, Feb. 2012, pp. 20-26.
ETSI GS NFV 003 V1.1 1, "Network Functions Virtualisation (NFV); Terminology for Main Concepts in NFV," Oct. 2013, 10 pages, European Telecommunications Standards Institute.
International Search Report and Written Opinion, PCT App. No. PCT/EP2017/071355, dated May 15, 2018, 10 pages.
Postel, J., "Internet Control Message Protocol, Darpa Internet Program Protocol Specification", Network Working Group, Request for Comments: 792, Sep. 1981, pp. 1-21.
Schuss et al., "A Competition to Push the Dependability of Low-Power Wireless Protocols to the Edge", EWSN '17: Proceedings of the 2017 International Conference on Embedded Wireless Systems and Networks, 2017, 12 pages.
Wennerstrom et al., "A Long-Term Study of Correlations between Meteorological Conditions and 802.15.4 Link Performance", 2013 IEEE International Conference on Sensing, Communications and Networking (SECON), IEEE, 2013, pp. 221-229.
Wolosz et al., "A measurement study of predicting throughput from LQI and RSSI", Computer Sciences, Dependable Communication and Computation Systems, 2012, 12 pages.
Communication pursuant to Article 94(3) EPC, EP App. No. 16728417.3, dated Mar. 2, 2021, 5 pages.
Final Office Action, U.S. Appl. No. 16/472,180, dated Apr. 13, 2021, 12 pages.
Intention to Grant, EP App. No. 17758856.3, dated Apr. 13, 2021, 5 pages.
International Preliminary Report on Patentability, PCT App. No. PCT/EP2017/071355, dated Mar. 5, 2020, 9 pages.
Non-Final Office Action, U.S. Appl. No. 16/634,557, dated Mar. 29, 2021, 13 pages.
Non-Final Office Action, U.S. Appl. No. 16/472,180, dated Feb. 23, 2021, 12 pages.
Office Action Appendix, U.S. Appl. No. 16/472,180, dated Jun. 3, 2021, 12 pages.

\* cited by examiner

MONITORING CONTROLLER AND A METHOD PERFORMED THEREBY FOR MONITORING NETWORK PERFORMANCE

CROSS-REFERENCE TO RELATED APPLICATIONS

This application is a National stage of International Application No. PCT/SE2016/050430, filed May 12, 2016, which is hereby incorporated by reference.

TECHNICAL FIELD

The present disclosure relates to monitoring of network performance and in particular to monitoring of network performance in a network comprising virtualised compute and network resources.

BACKGROUND

In a cloud environment, monitoring the network performance as perceived by applications and e.g. Virtual Network Functions, VNFs, running inside virtual machines or containers is important for identifying performance degradations, which may lead to violation of service level agreements. Monitoring the network performance may also be important for conducting root-cause analysis.

Application instances which run in virtual machines or containers may dynamically and frequently be started, scaled, migrated, and stopped. Therefore, keeping track of the lifecycle events of the application instances is required for automatic and real-time network performance monitoring.

Network monitoring may be performed using active or passive measurement methods. In active measurements, test packets are injected from a probe (aka a measurement point, MP) in the network and are received in another probe. The test packets may be collected in the receiver probe or reflected back to the sender probe. The test packets may be time stamped in both probes at sending and arrival events. In this way it is possible to study interaction between test packets (which may also be referred to as probe packets) and the cross traffic and draw conclusions about the network characteristics and the cross traffic dynamics. This approach is often called "active monitoring". In passive measurement, in contrast, network traffic is being observed without injecting additional test packets.

Both active and passive monitoring methods may be used for network performance measurement and troubleshooting of performance degradations. Examples of active monitoring tools include ping (Internet Control Message Protocol (ICMP)/Two-Way Active Measurement Protocol (TWAMP)/traceroute, iperf, netperf, etc. For many active measurement methods, a monitoring process is required on both the sender and the receiver side for generating test packets, time stamping, or reflecting the test packets.

When network degradation problems occur, existing monitoring systems typically identify the degradation and trigger alarms. For troubleshooting and identifying the cause, active monitoring tools may be used to localise the problem. Such tools often require the source and destination IP address (or other type of address) of the hosts that run the applications experiencing the degradation.

For example, a service orchestrator, or network manager, may have the knowledge about which VNFs belong to a service chain and communicate with each other, so a monitor controller or management systems have to query the service orchestrator about e.g. the location, IP address, and required monitoring metrics. Since the application instances may dynamically and frequently change, e.g. due to scaling, this information has to be continuously updated.

When a network problem such as performance degradation happens, the source and destination addresses might even not be known for a monitoring and troubleshooting tool to be launched.

A centralised monitoring controller/manager needs to have an interface to the service orchestrator to obtain information about the VNF instances or applications that communicate with each other to be able to instantiate and setup the required monitoring functions next to them. Such interface creates a significant overhead for the service orchestrator in case of frequent scale-in/scale-out and VNF migration processes. It also requires standardisation (or, alternately, continuous systems integration and testing) in order to guarantee that a monitoring controller developed by one vendor is able to communicate with an orchestrator developed by a different vendor.

One problem with some existing network monitoring tools is that they require a lot of information to be generated and stored, which puts a significant load on network resources for computing, storing and analysing the information. Another problem is that many existing tools are directed to one specific execution environment.

SUMMARY

The object is to obviate at least some of the problems outlined above. In particular, it is an object to provide a monitoring controller and a method for monitoring network performance. These objects and others may be obtained by providing a monitoring controller and a method performed by a monitoring controller according to the independent claims attached below.

According to an aspect, a method for monitoring network performance is provided. The method comprises determining, by a monitoring controller of a first host, a change in a communication between a first and a second application instance by observing application traffic exchanged between the first and second application instance, the first application instance being executed on the first host and the second application instance being executed on a second host. The method further comprises initiating, by the monitoring controller, a monitoring instance in the first host for exchanging test packets between the first host and the second host for monitoring network performance.

According to an aspect, a monitoring controller of a first host for monitoring network performance is provided. The monitoring controller is configured for determining a change in a communication between a first and a second application instance by observing application traffic exchanged between the first and second application instance, the first application instance being executed on the first host and the second application instance being executed on a second host; and for initiating a monitoring instance in the first host for exchanging test packets between the first host and the second host for monitoring network performance.

The monitoring controller and the method may have a plurality of possible advantages. One possible advantage is that the monitoring function may be distributed within local hosts, wherein no centralised monitoring function may be needed. Another possible advantage is that the solution provides distributed zero-touch and dynamic instantiation and configuration of active monitoring functions when required based on passively observed application instance communication.

BRIEF DESCRIPTION OF DRAWINGS

Embodiments will now be described in more detail in relation to the accompanying drawings, in which.

DETAILED DESCRIPTION

Briefly described, a monitoring controller and a method are provided for monitoring network performance. The monitoring controller is running on, or is executed by a first host. The first host also comprises an application instance which may communicate with other application instances on other hosts. The monitoring controller on the first host may detect a change in communication between an application on the first host and an application on a second host by observing application traffic exchanged between the application instance on the first host and an application instance on a second host. Once such a change in communication is detected, the monitoring controller may initiate a monitoring instance in the first host for exchanging test packets between the first host and the second host for monitoring network performance.

Figure 1A:
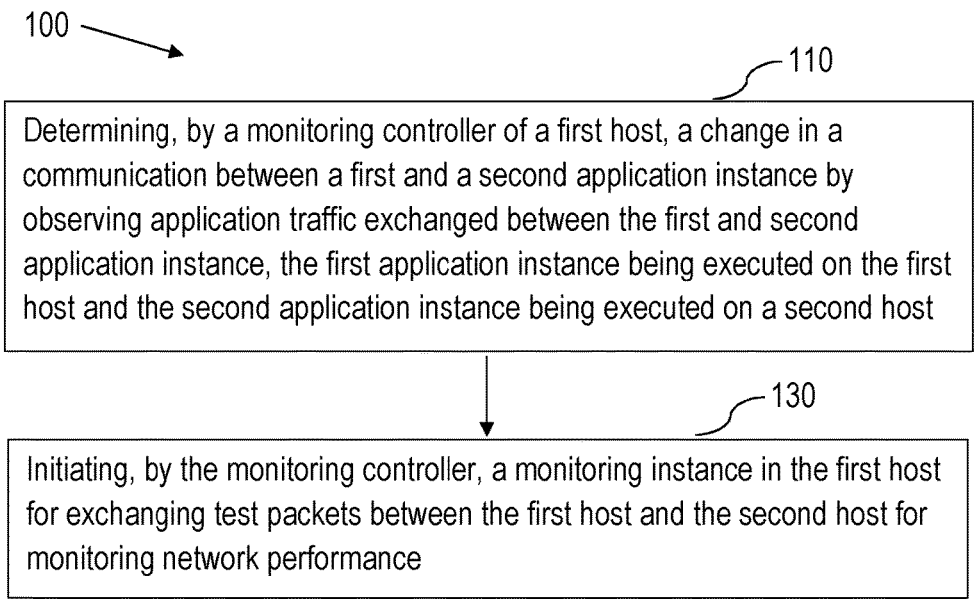
FIG. 1a is a flowchart of a method for monitoring network performance, according to an exemplifying embodiment.

Embodiments herein relate to a method for monitoring network performance. Embodiments will now be described with reference to FIGS. 1a-1d. FIG. 1a illustrates the method 100 comprising determining 110, by a monitoring controller of a first host, a change in a communication between a first and a second application instance by observing application traffic exchanged between the first and second application instance, the first application instance being executed on the first host and the second application instance being executed on a second host. The method further comprises initiating 130, by the monitoring controller, a monitoring instance in the first host for exchanging test packets between the first host and the second host for monitoring network performance.

The monitoring controller is comprised in, or running on, the first host. The first host may be a physical host or a virtual host. The first host may further comprise one or more application instances, i.e. at least the first application instance, wherein any application instance of the first host may communicate dynamically with other application instances on other host, e.g. the second application instance on the second host. The second host may also be a physical host or a virtual host. By the first host comprising one or more application instances means that the first host is executing the one or more application instances of the first host, or that the one or more application instances is/are running on the first host.

The monitoring controller of the first host may tap in on communications, e.g. packets from the second application instance on the second host being received by the first host destined for the first application instance and/or packets being transmitted from the first host destined for the second application instance on the second host. By tapping in on communication, also referred to as tapping traffic, received by the first host and sent from the first host, the monitoring controller may determine any change in communication between the first and the second application instance. The tapping in is an example of observing said communication. There may be other examples of observing the traffic as will be described below.

Once the monitoring controller determines that there is a change in the communication between the first and the second application instance, the monitoring controller may initiate the monitoring instance in the first host for exchanging test packets between the first host and the second host for monitoring network performance. Exchanging test packets means that test packets are sent between the first or the second host, e.g. the monitoring instance of the first host may transmit test packets to a corresponding monitoring instance of the second host and/or vice versa. The monitoring controller of the first host may thereby observe the performance of the network between the first and the second host.

The method may have a plurality of possible advantages. One possible advantage is that the monitoring function may be distributed within local hosts, wherein no centralised monitoring function may be needed. Another possible advantage is that the solution provides distributed zero-touch and dynamic instantiation and configuration of active monitoring functions when required based on passively observed application instance communication. Still a possible advantage is that the monitoring controllers run in a distributed fashion, wherein passive communication observation and possible associated data collection may be performed locally, so the monitoring controller may obtain timely and accurate information about which local application instances are communicating with which remote application instances. This provides another possible advantage that the monitoring function may be deployed without introducing an interface towards a service orchestrator. Yet another possible advantage is that IP address changes could be detected locally (for example, by inspecting Internet Protocol IP, packets, open and close connection packets, or by rapidly aging out an IP address that saw no traffic addressed to it in a short time interval) and therefore a local traffic matrix better reflects the actual situation in the first host or the network connecting the first and the second host. This also reduces the need for integration of the orchestrator or network management system with third-party IP address management tools, thus providing both OPEX and potentially CAPEX savings. Still a possible advantage is that the monitoring of exchanging test packets may be initiated and stopped dynamically and when needed. It is also possible to check if there is already active monitoring ongoing between two physical hosts. If a new pair of applications needs to be monitored between these hosts a new monitoring session is not needed and instead the measurements from the ongoing session may be used. This reduces the amount of test packets that are sent into the network for active measurements. This also means that the method may scale well and may also be used in cloud environments consisting of multiple data centres.

In an example, the determining 110 that there is a change in the communication between two application instances may comprise obtaining a notification that there is a change in the communication between two application instances.

When there is a change in communication, the monitoring controller may determine that by obtaining the notification of the change. For example, there may be a monitoring controller in the second host that has detected the change in traffic and sends a notification to the monitoring controller of the first host.

In this manner, the monitoring controller of the first host is made aware that there is a change in traffic between the two application instances, i.e. the first application instance being executed on the first host and the second application instance being executed on the second host.

In another example, the method further comprises receiving traffic exchanged between the first and a second virtual application instance, wherein the traffic is tapped 105 from a virtual switch comprised in the first host.

The first host may comprise a virtual switch, which may send a copy of all traffic, e.g. packets being switched within the first host, to a passive monitoring container which may detect the change and then inform the monitoring controller. By packets being switched within the first host means packets being received by the first host destined for the first application instance and/or packets being outputted from the first application instance and destined for any application instance on any other host. Tapping the traffic from the virtual switch may have additional advantages. For example, it is a resource-optimised way of obtaining network information. Further, the tapped data may be analysed and will hence not affect the performance of the data flow. Still further, tapping the traffic from the virtual switch is a lightweight solution when performed within one host.

Figure 1B:
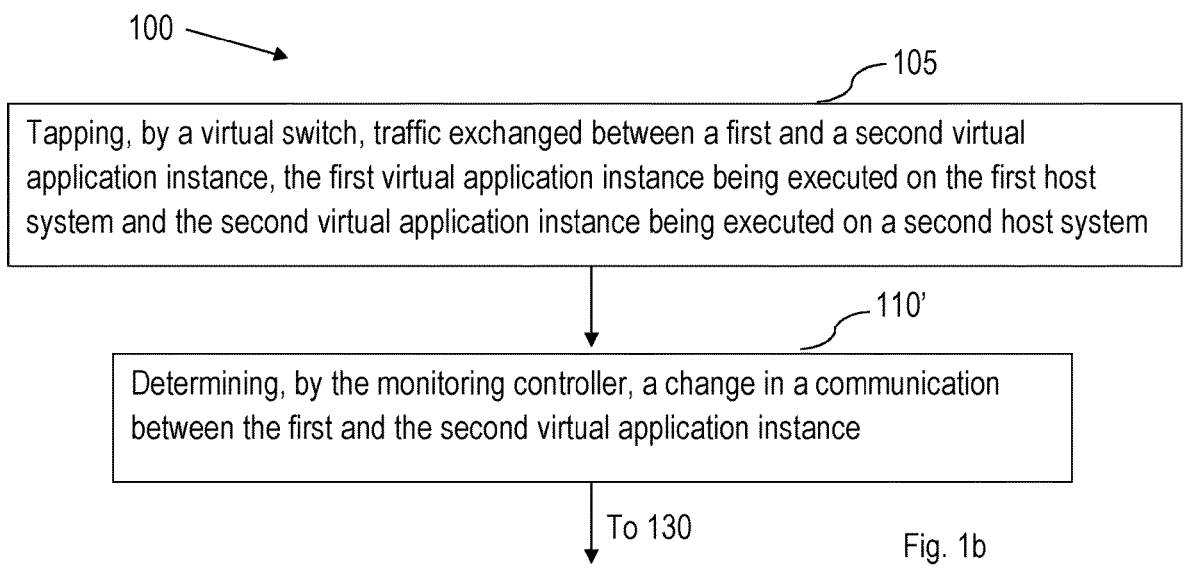
FIG. 1b is a flowchart of a method for monitoring network performance, according to a further exemplifying embodiment.

FIG. 1b is a flowchart of the method 100 for monitoring network performance, according to an exemplifying embodiment. The method 100 for monitoring network performance is performed in a first host system, the first host system comprising a processing device providing a virtual application instance platform, a virtual switch and a monitoring controller. In this embodiment, illustrated in FIG. 1b, the method comprises tapping 105, by the virtual switch, traffic exchanged between a first and a second virtual application instance, the first virtual application instance being executed on the first host system and the second virtual application instance being executed on a second host system. The method is also illustrated comprising determining 110', by the monitoring controller, the change in the communication between the first and the second virtual application instance and then initiating 130, by the monitoring controller, a monitoring instance in the first host for exchanging test packets between the first host and the second host for monitoring network performance.

In this exemplifying embodiment, the first host is referred to as the first host system and likewise the second host is referred to as the second host system. As will be explained in more detail below, the first and second host system may each comprise a processing device. The processing device provides the virtual application instance platform, a virtual switch and a monitoring controller. The virtual switch may receive traffic, e.g. in the form of packet(s), received from the second host and destined to the first application instance. The virtual switch may also receive traffic, e.g. in the form of packet(s), received from the second application instance and destined to the second application instance on the second host system. The virtual switch may be tapped 105, either by the monitoring controller or by e.g. a passive monitoring instance in order to "listen to" traffic involving the first application instance and thereby detecting any change in the traffic between the first and the second application instance. The monitoring controller may thus determine 110' (either by itself tapping the virtual switch or being notified from the passive monitoring instance) that there is a change in the communication between the first and the second virtual application instance and initiate 130 the monitoring instance in the first host for exchanging test packets between the first host and the second host for monitoring network performance. The monitoring controller may instruct a virtual switch to tap traffic exchanged between the two application instances.

The change may comprise any of a new communication between the two application instances; that an existing, previously active communication having expired; a change in traffic intensity; a change in traffic pattern; and a change of communication protocol.

There are many different examples of what a change might be. One example is the occurrence of a new communication between the first application instance on the first host and the second application instance on the second host. A new communication may comprise a traffic flow of packets being sent between the first application instance on the first host and the second application instance on the second host.

Another example is that an ongoing communication, i.e. an active communication, between the first application instance on the first host and the second application instance on the second host may change in one or more aspects. E.g. it may increase or decrease in intensity, meaning that e.g. the number and/or size of packets of the communication may change, the traffic flow may change to/from being relatively regular to being more erratic possibly indicating a problem in the network between the first host and the second host.

Still other examples of a change are that the communication expires or that the communication protocol that is being used is changed. Merely as an example, the communication protocol may change from TCP to user Datagram Protocol, UDP. Any change of communication protocol or above described changes may require the communication to be monitored, wherein the monitoring controller may initiate the monitoring instance in the first host for exchanging test packets between the first host and the second host for monitoring network performance.

The method 100 may further comprise determining 120 that no previous monitoring is currently ongoing between the hosts with regard to the detected change, at least not with regard to a metric associated with the detected change in the communication between the first and the second application instance.

It may be the case that there is an ongoing monitoring instance, especially with respect to a specific metric, between the first host and the second host. If there already is an ongoing monitoring between the first and the second host, there may be no need to initiate another monitoring instance. However, if no previous monitoring is currently ongoing between the hosts with regard to the detected change, then the monitoring controller may initiate the monitoring instance in the first host for exchanging test packets between the first host and the second host for monitoring network performance.

The detected change may be associated with a specific metric, e.g. capacity, latency, end-to-end delay, or end-to-end packet loss, wherein there may be an ongoing monitoring instance between the hosts with regard to one metric. If the detected change is related to another metric than the metric being monitored by the currently ongoing monitoring instance, then the ongoing monitoring instance may either be changed to include monitoring the communication also with regard to the metric associated with the detected change; or alternatively the monitoring controller may initiate a new monitoring instance with regard to the metric for which the change has been detected.

Figure 1C:
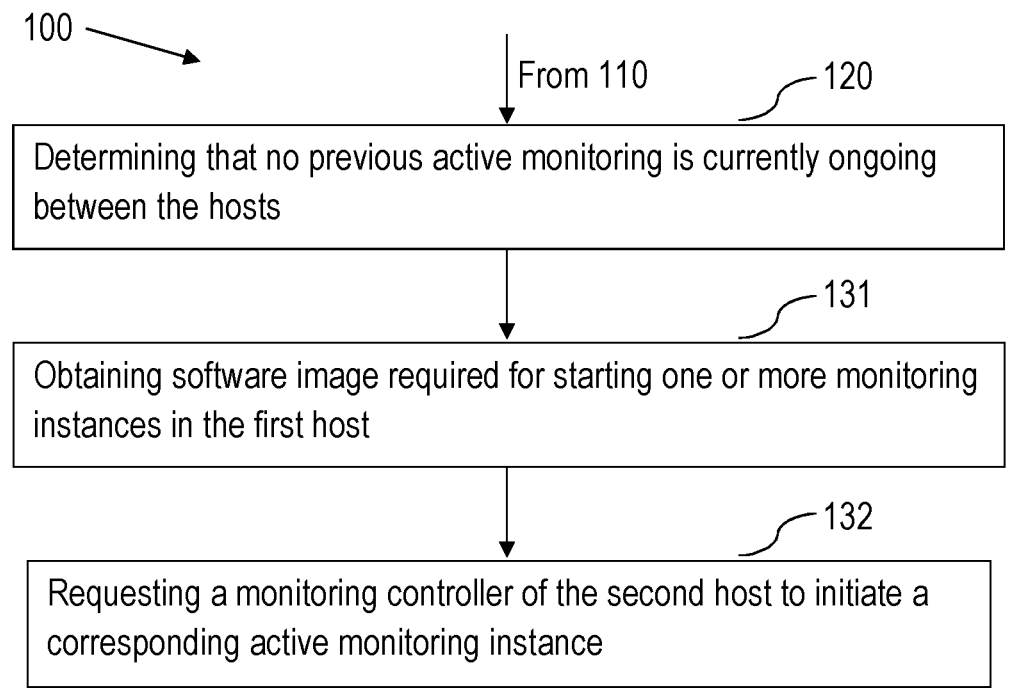
FIG. 1c is a flowchart of a method for monitoring network performance, according to yet an exemplifying embodiment.
Figure 1D:
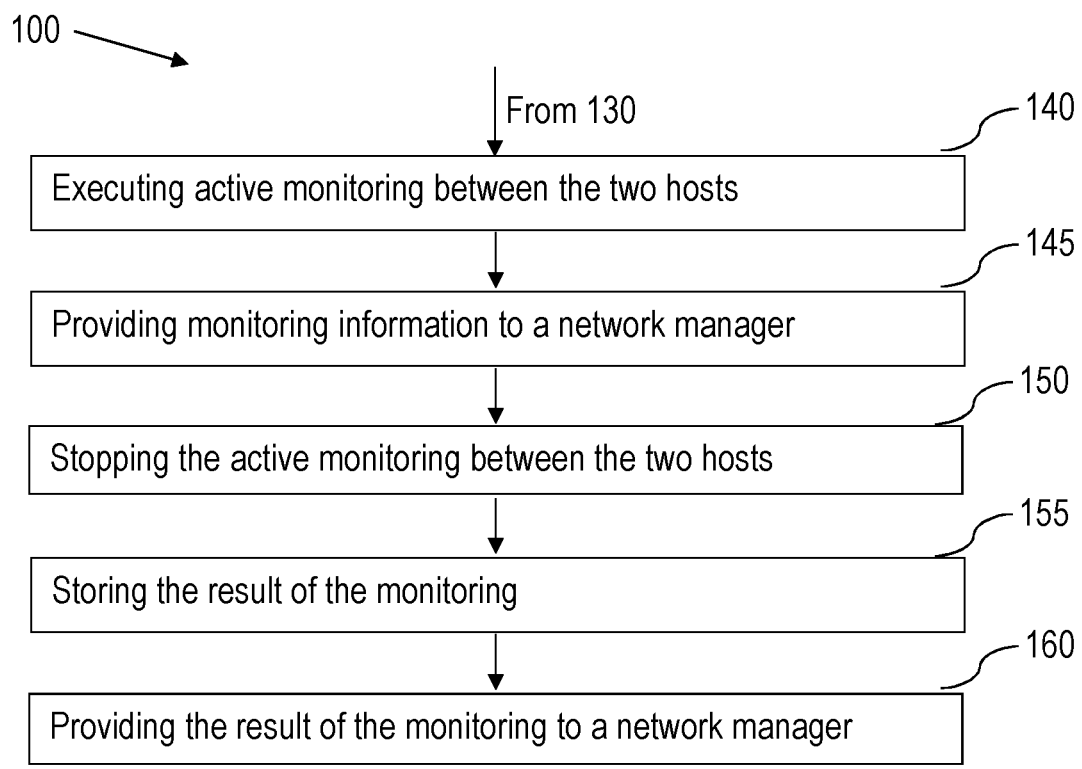
FIG. 1d is a flowchart of a method for monitoring network performance, according to still an exemplifying embodiment.

In an example, illustrated in FIG. 1c, the initiating 130 of the monitoring instance in the first host for transmitting test packets from the first host to the second host comprises obtaining 131 a software image required for starting one or more monitoring instances in the first host.

The software image is representative of the type of monitoring that is to be performed. In some cases the active monitoring software is not available at the host, hence a software image may be retrieved from a software image repository (such as a Docker repository). The software image is downloaded and installed where needed. The container is then started and stopped according to the method explained in the application.

In a further example, illustrated in FIG. 1c, the method 100 further comprises requesting 132 a monitoring controller of the second host to initiate a corresponding monitoring instance.

In order for the monitoring controller to perform monitoring, it may be necessary to have a monitoring instance in the second host. Then the monitoring instance of the first host and the monitoring instance of the second host may send test packets between themselves thereby evaluating network performance with regard to one or more metrics. The test packets may be time stamped in respective monitoring instance, they may be reflected back to the monitoring instance first transmitting it, the monitoring instances may exchange information between each other etc.

If no monitoring instance is running on, or is comprised in the second host, the monitoring controller of the first host may request the monitoring controller of the second host to initiate a monitoring instance on the second host.

In case there already is a monitoring instance running in the second host, the same monitoring instance may be used. The monitoring instance in the second host may e.g. receive test packets transmitted from the monitoring instance in the first host, time stamp the test packets and/or reflect the test packets back to the monitoring instance in the first host. By reflecting a test packet means that the monitoring instance in the second host transmits a corresponding test packet back to the monitoring instance in the first host from which the monitoring instance in the second host received them. Examples of packet reflecting tools and methods are ping and TWAMP.

The method 100 may further comprise executing 140 the monitoring between the two hosts.

Once the change is detected and the monitoring instances are initiated, the monitoring between the two hosts may be executed. The execution of the monitoring may comprise various actions as will be described below.

The executing 140 of the monitoring may comprise starting the monitoring instance.

The monitoring controller has initiated the monitoring instance in the first host for exchanging test packets between the first host and the second host for monitoring network performance. Once this is done, the monitoring controller may start the monitoring instance in the first host, wherein the monitoring instance in the first host may transmit and/or receive test packets e.g. to/from the monitoring instance in the second host.

By analysing different characteristics associated with the transmission and/or reception of the test packet(s), the monitoring instance may evaluate different metrics of the network associated with the transmission and/or reception of the test packet(s). Either each test packet may generate monitoring information or two or more test packets may be analysed and/or evaluated to obtain monitoring information pertaining to network performance.

The method 100 may further comprise providing 145 monitoring information to a manager.

The monitoring may result in various monitoring information and/or results. The information may be provided continuously, regularly or at random/specific points in time. For example, as soon as monitoring information is obtain, e.g. after a test packets has been sent and reflected back or a test packet has been received such that there is information available to obtain monitoring information, the monitoring information may be transmitted to the manager. In another example, a number of packets have to be exchanged between the two monitoring instances in the first and second host respectively before any analysis or evaluation is performed to obtain monitoring information.

The monitoring information may be transmitted as soon as it is obtained, at regular time intervals, after a certain criterion is fulfilled etc.

The manager may then use the received monitoring information to take any appropriate action(s) that may be needed, or refrain to take any action if the received monitoring information so indicates.

The method 100 may yet further comprise stopping 150 the monitoring between the two hosts and providing 160 a result of the monitoring to the manager.

Once the monitoring between the two hosts is determined to be done, the monitoring controller may stop the monitoring. The monitoring information may have been reported continuously, randomly, regularly or not at all before the stopping of the monitoring. In case there is monitoring information which has not yet been provided to the manager, the monitoring controller may provide the not reported monitoring information to the manager, thereby providing the manager with a result of the monitoring.

The monitoring controller may also process the obtained monitoring information in order to produce a monitoring result to be provided to the manager.

In an example, application traffic is exchanged between virtualised applications, or wherein the application instances are virtualised applications.

Application traffic may be transmitted between the first application instance and the second application instance. The first and/or the second application instance may be virtualised applications.

A physical device may run one or more virtualised machines or platforms upon which the application instance(s) is/are run, being virtualised applications. Also the monitoring controller and the monitoring instance(s) may be run in the virtualised machine(s) or platform(s), wherein the monitoring controller and the monitoring instance(s) are also being virtualised.

The monitoring controller, the two application instances and the monitoring instance(s) may correspond to individual containers, individual virtual machines or uni-kernels or similar technology.

These are examples of virtual implementations. Generally, a container-based implementation, also referred to as virtualisation engines, implies that the kernel of an operating system allows for multiple isolated user-space instances instead of just one. From "the outside", they may look like a real server or physical device.

Uni-kernels are generally referred to as specialised single address space machine images implemented using library operating systems. Uni-kernels may run directly on e.g. a hypervisor or hardware without an intervening operating system.

A virtual machine is generally referred to as an emulation of a particular computer system. Virtual machines may operate based on computer architecture and functions of a real or hypothetical computer. Implementations of virtual machines may involve specialised hardware, software or a combination of both.

The method 100 may further comprise requesting resources to be reserved on the first host for a monitoring instance from a manager.

In order for the monitoring instance on the first host to be created, resources are needed on the host. Thus the monitoring controller may request the manager to reserve resources for the monitoring instance on the first host. The resources may be in terms of CPU, memory, disk utilisation etc.

The manager may then reserve the necessary resources on the first host, wherein the monitoring instance may be executed or run on the first host for performing various measurements as described above.

In case there is a need to create a monitoring instance on the second host, then the monitoring controller on the second host may request resources to be reserved on the second host for the monitoring instance from the manager.

Figure 2A:
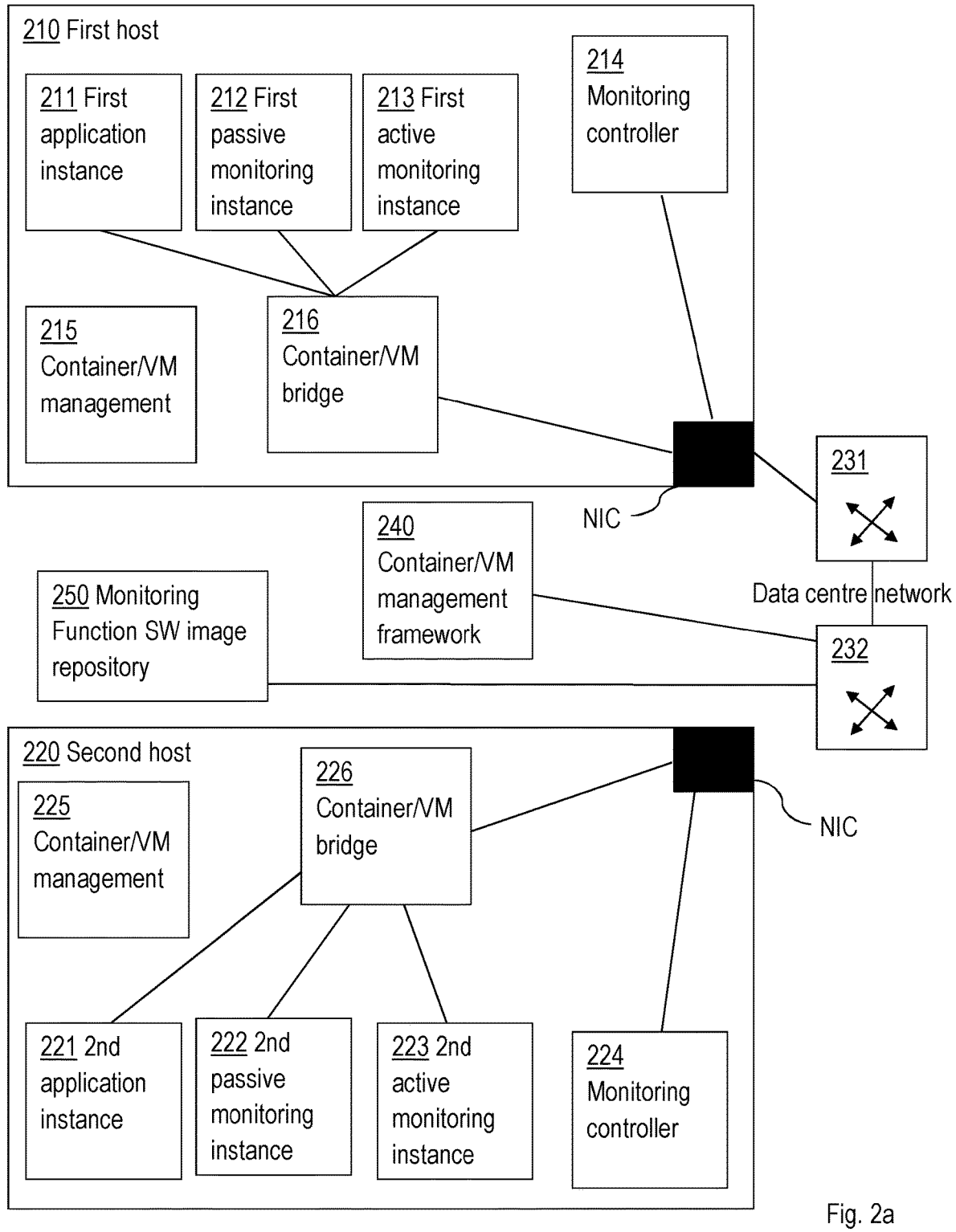
FIG. 2a is a block diagram of a first and second host of a data centre.

FIG. 2a illustrates the first host 210, and also other hosts such as the second host 220, comprising a virtual switch 216, 226, herein also referred to as a container bridge or a virtual machine bridge. In general, the virtual switch 216, 226 may receive communication, e.g. in the form of packets of a traffic flow, being received by the host 210, 220 destined for the application instance 211, 221 and forward the communication (e.g. packet(s)) to the application instance 211, 220. Further, the virtual switch 216, 226 may receive communication outputted from the application instance 211, 221 and forward the communication according to a destination address, e.g. to a Network Interface Controller, NIC, to be outputted from the host 210, 220. Any type of communication to and/or from the application instance received by the virtual switch may be copied and forwarded to a passive monitoring instance, e.g. the first passive monitoring instance 212 in the first host 210 or the second passive monitoring instance 222 in the second host 220. In this manner, the passive monitoring instance 212, 222 may tap into the communication flowing through the virtual switch 216, 226.

The first and the second host 210, 220 also comprises a respective monitoring controller 214 and 224, which may control the first and the second passive monitoring instance 212, 222 as well as a first active monitoring instance 213 and a second active monitoring instance 223 respectively.

In the example illustrated in FIG. 2a, the first host 210 and the second host 220 are part of a data centre, wherein the network connecting the first host 210 and the second host 220 is referred to as a data centre network.

In other words, passive monitoring may run in a container or virtual machine and passively receive mirrored traffic to and from the application instance on that host. An example of an application instance is a Virtualised network Function, VNF. The VNF is defined by European Telecommunications Standards Institute, ETSI, see ETSI GS NFV 003 V1.1.1 (2013-10). Alternatively the passive monitoring may share the same network stack with the application instance containers or virtual machines, also referred to as VNF containers or VNF virtual machines. Another alternative is that the passive monitoring may run on the host machine, e.g. as part of the monitoring controller, listening to the network namespace of the application instances.

The passive monitoring instance 212, 222 may detect a change in traffic to/from the application instance 211, 221 and notify the monitoring controller 214, 224. In this manner, the monitoring controller 214, 224 may receive an event/message from the passive monitoring instance 212, 222 when there is a change in the user traffic that is passively being observed, thereby the monitoring controller 214 may determine 110 a change in a communication between a first and a second application instance by observing application traffic exchanged between the first and second application instance, the first application instance being executed on the first host and the second application instance being executed on a second host. A change may e.g. correspond to a new flow or expiration of a previously active flow. Flow expiration may happen when the application instance 211, 212 has not sent or received any packets from a remote application instance for a pre-defined amount of time.

The monitoring controller 214, 224 may decide, for example based on operator policies, if a new flow needs to be actively monitored or not. Alternatively, if the passive monitoring instance 212, 222 already monitors some metrics e.g. packet loss, the monitoring controller 214, 224 may decide to initiate active measurement sessions to complement the passive measurements and obtain more troubleshooting data.

For example, if the monitoring controller 214 decides to actively monitoring the flow associated with the detected change, the monitoring controller 214 initiates 130 a monitoring instance, i.e. the first active monitoring instance 213 in FIG. 2a, in the first host 210 for exchanging test packets between the first host 210 and the second host 220 for monitoring network performance.

For many types of active monitoring, both a sender monitoring instance and a receiver/reflector monitoring instance may be required. If a reflector monitoring instance is not present on the receiver side e.g. on the second host 220, the monitoring controller 214 of the sender side, the first host 210, may request the remote the monitoring controller 224 to instantiate a reflector monitoring instance 221 for the active monitoring session. The monitoring controller 214 may also stop measurement sessions after a pre-determined time, or when network performance problem is resolved, or the path does not require monitoring anymore since the traffic flows have expired meaning that the traffic between the first application instance 211 and the second application instance 221 have expired or ended.

The passive monitoring, e.g. passive data collection, may be performed all the time, and active measurements are started only for monitoring the network between application instances that communicate at each point in time. Therefore, while providing continuous monitoring of the system, the active test, or probe, packets are only sent on network paths on which monitoring have been requested. This may be particularly important for example when using high speed measurements with Data Plane Development Kit, DPDK, which takes full control of an interface and uses a full Central Processing Unit, CPU, core to receive measurements packets. Therefore, it may be important to be able to automatically start and stop senders and reflectors to avoid wasting compute and network resources.

During the monitoring, also referred to as measurement sessions, or at the end of the measurement sessions, the monitoring controller 214, 224 may communicate with higher management levels, a manager or an orchestrator sending monitored data/alarms based on passive and active measurements, as well as compute resource utilisation of containers or virtual machines which may be obtained locally, for example from Docker application Interface, API. The manager or orchestrator may then make decisions such as migration or scaling of the application, or VNF, instances experiencing network performance problems.

FIG. 2a illustrates two hosts 210 and 220, datacentre network switches 231 and 232, a monitoring function software image repository 250, and a container/virtual machine management framework 240. In each host 210, 220, according to this example, a VNF or application instance 211, 221, a monitor controller 214, 224, a passive monitoring instance 212, 222, an active monitoring instance 213, 223, a container bridge or virtual switch 216, 226, a container management system 215, 225 and a Network Interface Controller, NIC, exist. The container management 215, 225 may alternatively be located outside the hosts 210, 220. The VNF and monitoring containers run inside containers or virtual machines and are connected to the same bridge or virtual switch. The software image required for starting the monitoring containers may be obtained from the monitoring Function Software image repository by the container management system.

In this example, the first application instance 211 which is running in a container or virtual machine in the first host 210 is communicating with the second application instance container or virtual machine 221 in the second host 220. The passive monitoring containers or virtual machines 212 and 222 are already established in both hosts and passively observe copies of packets sent from or received by the corresponding application (VNF) instance which is being monitored, for example using port mirroring on the virtual switch or the container bridge 216, 226.

A monitor controller 214, 224 is running in each host as a process on the host machine or as a privileged container or virtual machine. The monitor controller 214, 224 may be responsible for automatic instantiation, configuration, and stopping of the passive and active monitoring instances 212, 213, 222 and 223. The monitor controller 214, 224 may get information about new flows, i.e. traffic to/from a new application instance, from the local passive monitoring 212, 222. If active monitoring is required for the new flow and the path that the flow traffic traverses is not already being monitored, the monitor controller 214, 224 may request from the container management system to instantiate an active monitoring container or virtual machine 213, 223.

The monitor controller 214, 224 may also be responsible for providing the configuration required for performing active measurements for the active monitoring instances 213, 223 being instantiated.

Each monitoring controller 214, 224 may also communicate with monitoring controllers on the other hosts or servers in the datacentre to request for a new receiver/reflector active monitoring instance if required for the measurements or monitoring. Moreover, each monitoring controller 214, 224 may inform a remote monitoring controller 214, 224 to stop the receiver active monitoring container (or virtual machine) when it is not needed anymore in order to avoid waste of server resources. Monitoring controllers may potentially exchange messages with each other to identify which paths are being monitored, which monitor functions are associated with which application instances (e.g. VNFs) etc.

Figure 2B:
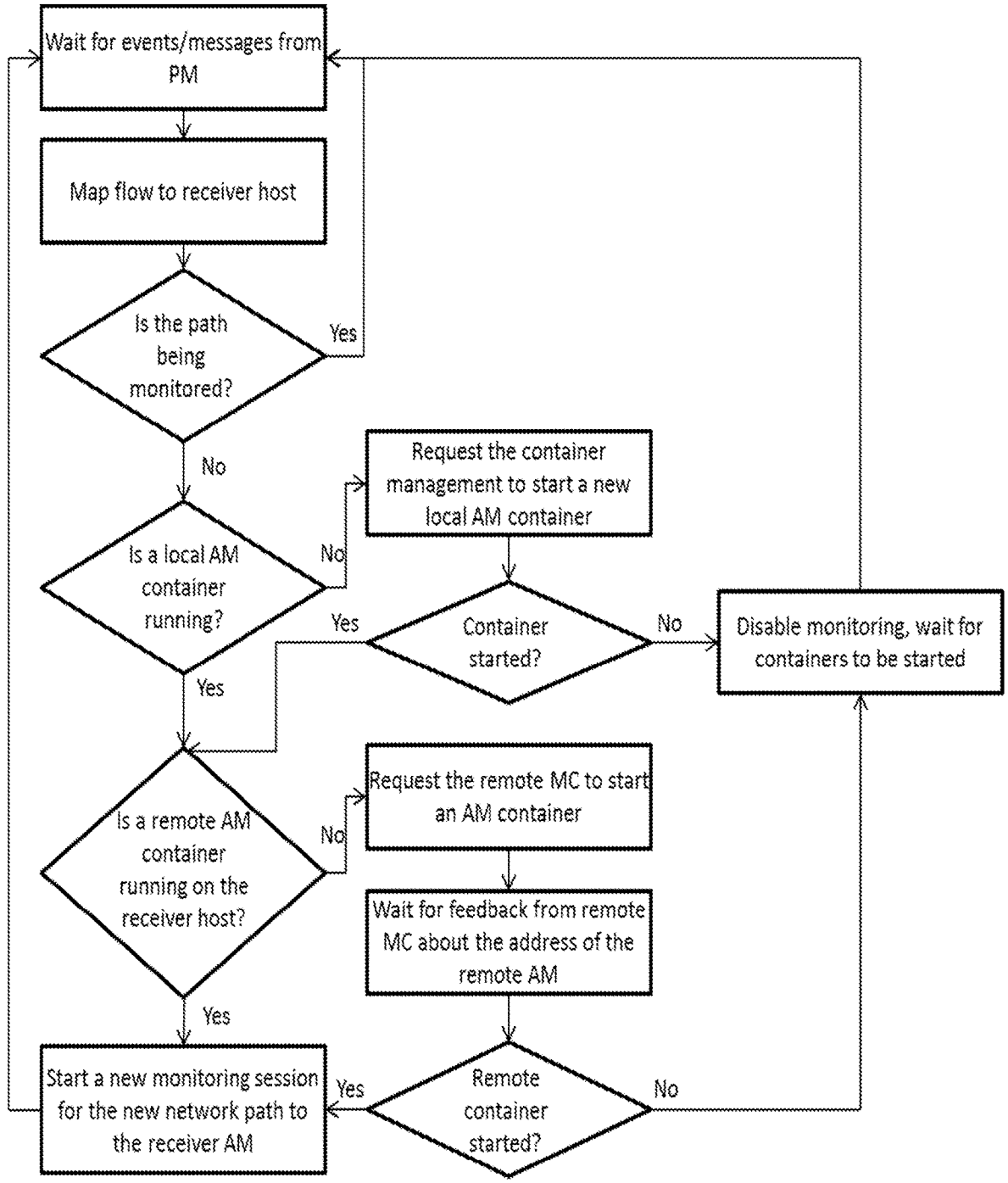
FIG. 2b is a flowchart of a method for monitoring network performance, according to a further exemplifying embodiment.

FIG. 2b is a flowchart of a method performed by the monitoring controller according to an exemplifying embodiment. The monitoring controller waits for an event or message from the passive monitor, PM, about a new flow for the VNF/application which is being monitored.

Based on the information about the source and destination addresses of the VNFs that are part of the flow, the monitoring controller, MC, should identify on which server the remote VNF instance is located. The mapping information about where the receiver VNF is running may be obtained in different ways. One alternative is that MCs populate a distributed database (e.g. a key/value storage) with mapping of each VNF Internet Protocol, IP, address and/or each host machine identifier. The mapping may also include information about the IP address of the monitoring functions that are associated with the VNF. Another alternative is that local MC is connected to other MCs in a peer-to-peer fashion or in a hierarchical scheme and may query from its peers. One more alternative is to query a logically centralised monitor controller.

The MC checks if the path between the local and remote host/server is already being actively monitored or not. If there is already an active monitor, monitoring the required metric on the network between the sender and receiver host, there is no need for instantiating a new AM container.

If an AM container is not running on the local server, the MC starts an AM container by requesting the container management system.

If the required resources for starting the new AM container are not available, the MC receives a feedback and monitoring is stopped waiting for container(s) to be started.

If the active monitoring requires a receiver side reflector, the MC queries the remote MC to request for a remote reflector AM to be started.

After receiving the feedback about successful instantiation of the remote AM, the MC configures the AM to start the monitoring session. If the remote container has failed to start, the MC also receives a feedback and can stop the sender AM container if required.

Optionally, the MC or another entity or container can perform some processing of the monitored data obtained from both passive and active monitors, for example in order to generate alarms if the network performance has degraded.

Figure 2C:
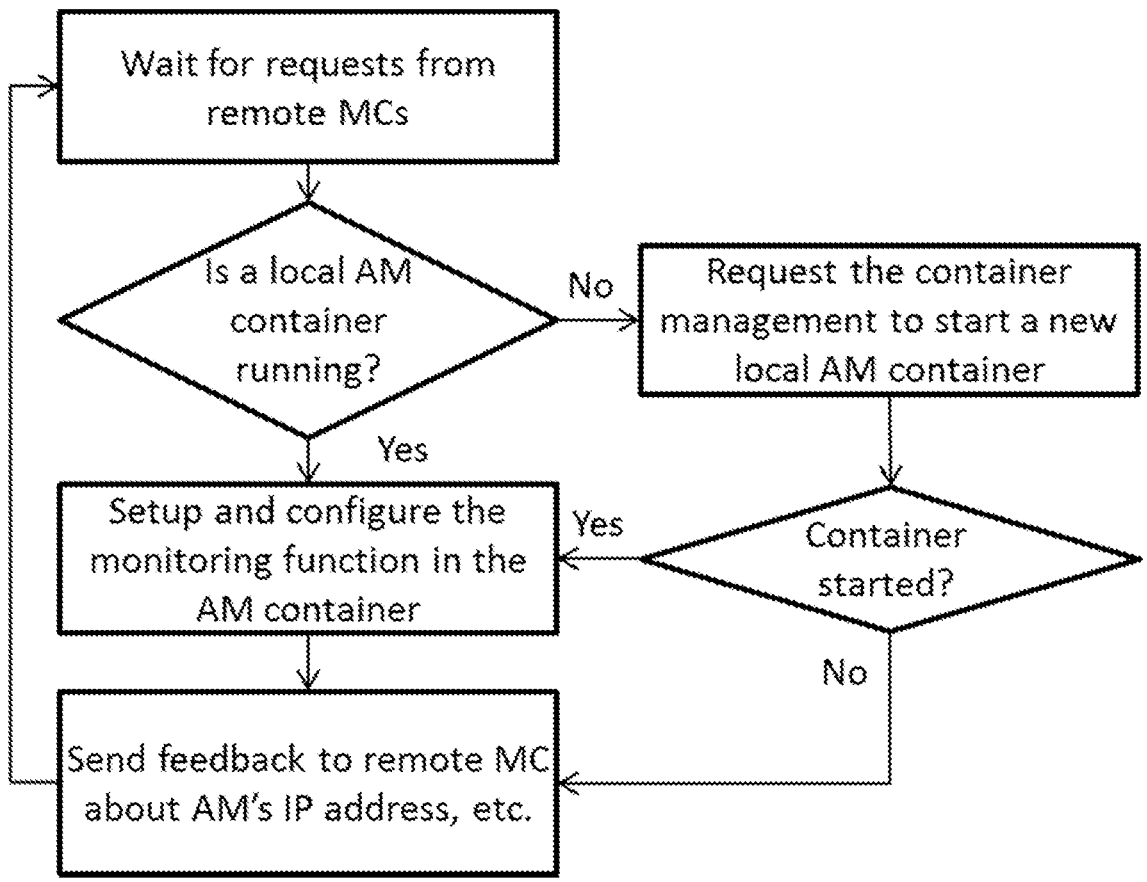
FIG. 2c is a flowchart of a method performed by a monitoring controller on a receiving side for monitoring network performance, according to an exemplifying embodiment.

FIG. 2c is a flowchart of a method performed by the monitoring controller on the second host, the receiver side, according to an exemplifying embodiment.

The MC waits for requests from remote MCs for monitoring functions. If a local AM does not exist, the MC creates an AM container by requesting the container management system.

The MC configures the requested monitoring function is the AM container (e.g. a reflector for Two-Way Active Measurement Protocol, TWAMP, which listens to a port).

The MC sends feedback with data about the AM's successful or failed start. In case of success, the IP and port addresses etc. are sent to the sender MC.

Figure 2D:
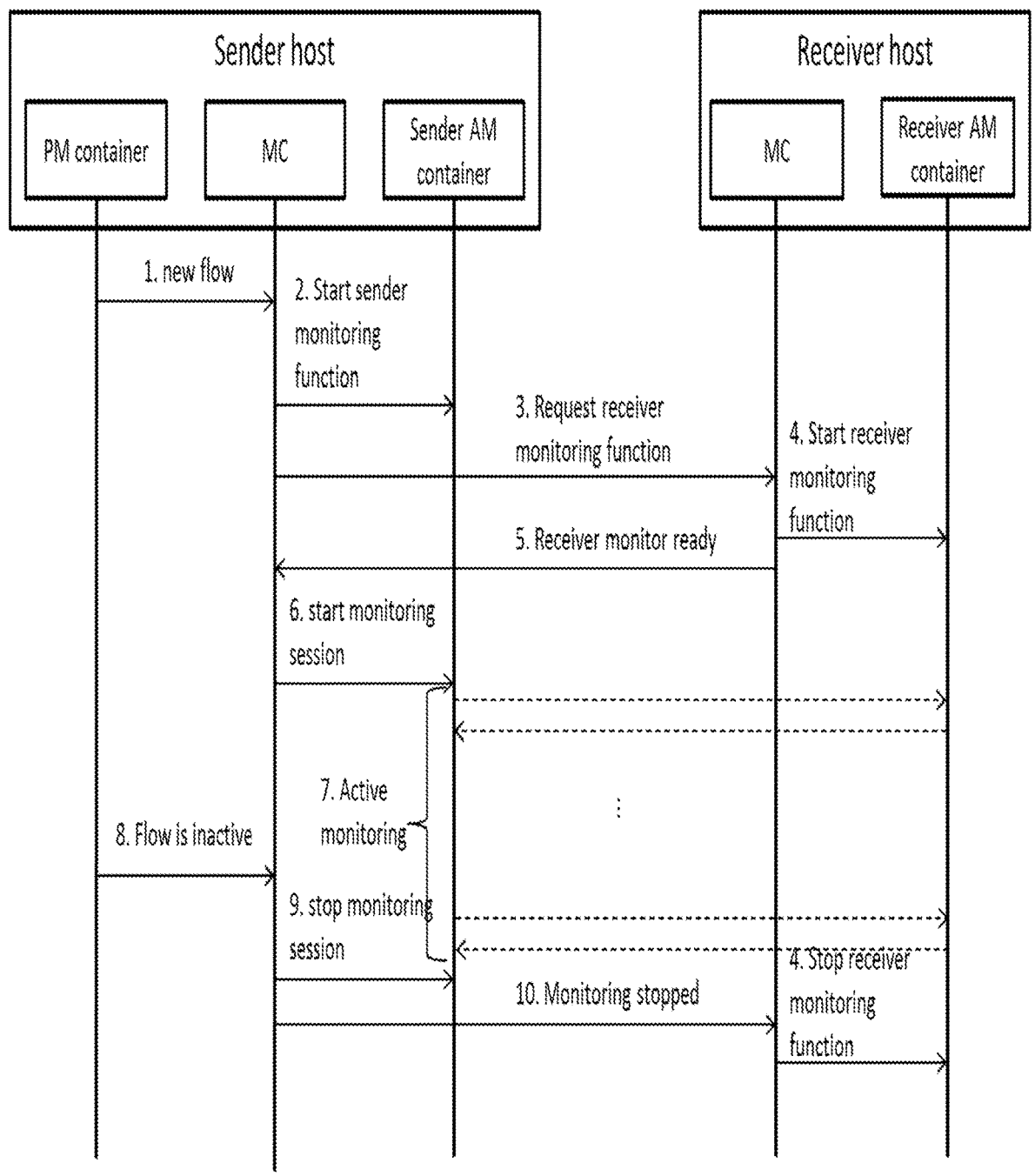
FIG. 2d is a signalling diagram or sequence illustrating signalling and communication within a sender host, e.g. a first host, between the sender host and a receiver host, e.g. a second host, and within the second host.

FIG. 2d is a signalling diagram or sequence illustrating signalling and communication within a sender host, e.g. a first host, between the sender host and a receiver host, e.g. a second host, and within the second host.

If a new flow is observed by the PM of the sender host, the MC of the sender host receives an event from the PM and starts active monitoring if required. The PM should keep track of all active flows and should remove flows that have not been active, i.e. have not exchanged any packets within a pre-defined amount of time, to provide an up-to-date view of the application instance communications to the MC. When a flow expires, i.e. PM of the sender host has not seen any packets for that flow for the pre-defined amount of time, the PM sends an event to MC of the sender host. MC then stops the active monitoring function to avoid waste of resources Embodiments herein also relate to a monitoring controller of a first host for monitoring network performance. The monitoring controller has the same technical features, objects and advantages as the method described above. The monitoring controller will therefore be described only in brief in order to avoid unnecessary repetition. The monitoring controller will be described with reference to FIGS. 3 and 4.

Figure 3:
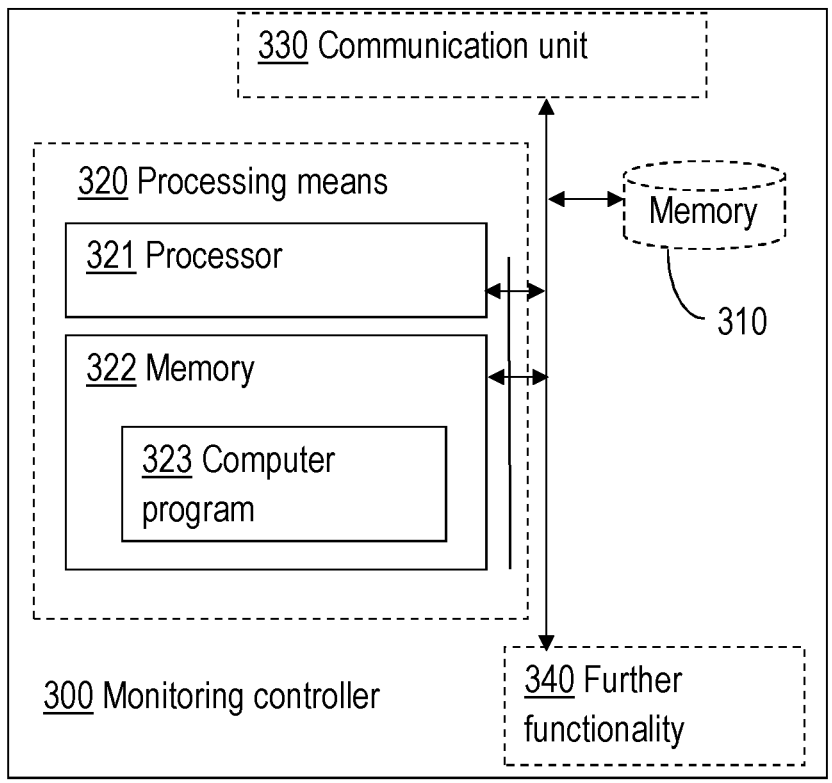
FIG. 3 is a block diagram of a monitoring controller for monitoring network performance, according to an exemplifying embodiment.

FIG. 3 illustrates the monitoring controller 300, 400 being configured for determining a change in a communication between a first and a second application instance by observing application traffic exchanged between the first and second application instance, the first application instance being executed on the first host and the second application instance being executed on a second host; and for initiating a monitoring instance in the first host for exchanging test packets between the first host and the second host for monitoring network performance.

The monitoring controller 300, 400 may be realised or implemented in various different ways. A first exemplifying implementation or realisation is illustrated in FIG. 3. FIG. 3 illustrates the monitoring controller 300 comprising a processor 321 and memory 322, the memory comprising instructions, e.g. by means of a computer program 323, which when executed by the processor 321 causes the monitoring controller 300 to determine a change in a communication between a first and a second application instance by observing application traffic exchanged between the first and second application instance, the first application instance being executed on the first host and the second application instance being executed on a second host. The memory further comprises instructions, which when executed by the processor 321 causes the monitoring controller 300 to initiate a monitoring instance in the first host for exchanging test packets between the first host and the second host for monitoring network performance.

FIG. 3 also illustrates the monitoring controller 300 comprising a memory 310. It shall be pointed out that FIG. 3 is merely an exemplifying illustration and memory 310 may be optional, be a part of the memory 322 or be a further memory of the monitoring controller 300. The memory may for example comprise information relating to the monitoring controller 300, to statistics of operation of the monitoring controller 300, just to give a couple of illustrating examples. FIG. 3 further illustrates the monitoring controller 300 comprising processing means 320, which comprises the memory 322 and the processor 321. Still further, FIG. 3 illustrates the monitoring controller 300 comprising a communication unit 330. The communication unit 330 may comprise an interface through which the monitoring controller 300 communicates with other nodes or entities of the communication network as well as other communication units. FIG. 3 also illustrates the monitoring controller 300 comprising further functionality 340. The further functionality 340 may comprise hardware or software necessary for the monitoring controller 300 to perform different tasks that are not disclosed herein.

Figure 4:
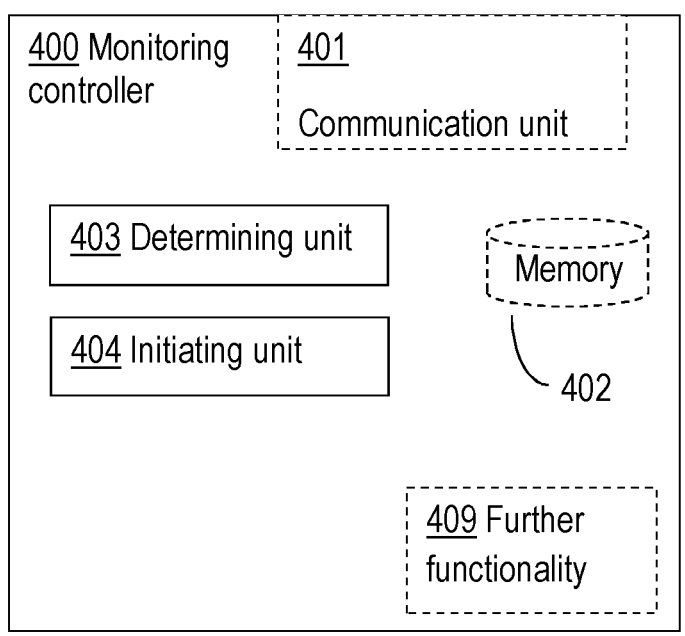
FIG. 4 is a block diagram of a monitoring controller for monitoring network performance, according to another exemplifying embodiment.

An alternative exemplifying implementation of the monitoring controller 300, 400 is illustrated in FIG. 4. FIG. 4 illustrates the monitoring controller 400 comprising a determining unit 403 for determining a change in a communication between a first and a second application instance by observing application traffic exchanged between the first and second application instance, the first application instance being executed on the first host and the second application instance being executed on a second host. The monitoring controller 400 further comprises an initiating unit 404 for initiating a monitoring instance in the first host for exchanging test packets between the first host and the second host for monitoring network performance.

In FIG. 4, the monitoring controller 400 is also illustrated comprising a communication unit 401. Through this unit, the monitoring controller 400 is adapted to communicate with other nodes and/or entities in the wireless communication network. The communication unit 401 may comprise more than one receiving arrangement. For example, the communication unit 401 may be connected to both a wire and an antenna, by means of which monitoring controller 400 is enabled to communicate with other nodes and/or entities in the wireless communication network. Similarly, the communication unit 401 may comprise more than one transmitting arrangement, which in turn is connected to both a wire and an antenna, by means of which the monitoring controller 400 is enabled to communicate with other nodes and/or entities in the wireless communication network. The monitoring controller 400 is further illustrated comprising a memory 402 for storing data. Further, the monitoring controller 400 may comprise a control or processing unit (not shown) which in turn is connected to the different units 403-404. It shall be pointed out that this is merely an illustrative example and the monitoring controller 400 may comprise more, less or other units or modules which execute the functions of the monitoring controller 400 in the same manner as the units illustrated in FIG. 4.

It should be noted that FIG. 4 merely illustrates various functional units in the monitoring controller 400 in a logical sense. The functions in practice may be implemented using any suitable software and hardware means/circuits etc. Thus, the embodiments are generally not limited to the shown structures of the monitoring controller 400 and the functional units. Hence, the previously described exemplary embodiments may be realised in many ways. For example, one embodiment includes a computer-readable medium having instructions stored thereon that are executable by the control or processing unit for executing the method steps in the monitoring controller 400. The instructions executable by the computing system and stored on the computer-readable medium perform the method steps of the monitoring controller 400 as set forth in the claims.

In yet a further implementation, the first host comprises a processing device providing a virtual application instance platform, a virtual switch and a monitoring controller. Then the virtual controller is configured for tapping traffic exchanged between a first and a second virtual application instance, the first virtual application instance being executed on the first host and the second virtual application instance being executed on a second host. The monitoring controller is configured for determining a change in communication between the first and the second virtual application instance. The monitoring controller is further configured for initiating a monitoring instance in the first host for exchanging test packets between the first host and the second host for monitoring network performance.

The monitoring controller has the same possible advantages as the method performed by the monitoring controller. One possible advantage is that the monitoring function may be distributed within local hosts, wherein no centralised monitoring function may be needed. Another possible advantage is that the solution provides distributed zero-touch and dynamic instantiation and configuration of active monitoring functions when required based on passively observed application instance communication. Still a possible advantage is that the monitoring controllers run in a distributed fashion, wherein passive communication observation and possible associated data collection may be performed locally, so the monitoring controller may obtain timely and accurate information about which local application instances are communicating with which remote application instances. This provides another possible advantage that the monitoring function may be deployed without introducing an interface towards a service orchestrator. Yet another possible advantage is that IP address changes could be detected locally (for example, by inspecting the Internet Protocol packet, IP, open and close connection packets, or by rapidly aging out an IP address that saw no traffic addressed to it in a short time interval) and therefore a local traffic matrix better reflects the actual situation in the first host or the network connecting the first and the second host. This also reduces the need for integration of the orchestrator or network management system with third-party IP address management tools, thus providing both OPEX and potentially CAPEX savings. Still a possible advantage is that the monitoring of exchanging test packets may be initiated and stopped dynamically and when needed. It is also possible to check if there is already active monitoring ongoing between two physical hosts. If a new pair of applications needs to be monitored between these hosts a new monitoring session is not needed and instead the measurements from the ongoing session may be used. This reduces the amount of test packets that are sent into the network for active measurements. This also means that the method may scale well and may also be used in cloud environments consisting of multiple data centres.

According to an embodiment, the monitoring controller is further configured to determine that there is a change in the communication between two application instances by obtaining a notification that there is a change in the communication between two application instances.

According to yet an embodiment, the monitoring controller is further configured to receive traffic between the two application instances, wherein the traffic has been tapped from a virtual switch comprised in the first host.

According to an alternative embodiment, the monitoring controller is further configured to instruct the virtual switch to tap traffic exchanged between the two application instances.

According to still an embodiment, the change comprises any of a new communication between the two application instances; that an existing, previously active communication having expired; a change in traffic intensity; a change in traffic pattern; and a change of communication protocol.

According to another embodiment, the monitoring controller is further configured for determining that no previous monitoring is currently ongoing between the hosts with regard to the detected change, at least not with regard to a metric associated with the detected change in the communication between the first and the second application instance.

According to a further embodiment, the monitoring controller is further configured for initiating the monitoring instance in the first host for transmitting test packets from the first host to the second host by obtaining a software image required for starting one or more monitoring instances in the first host.

According to an embodiment, the monitoring controller is further configured for requesting a monitoring controller of the second host to initiate a corresponding monitoring instance.

According to yet an embodiment, the monitoring controller is further configured for executing the monitoring between the two hosts.

According to still an embodiment, the monitoring controller is further configured for executing the monitoring by starting the monitoring instance.

According to another embodiment, the monitoring controller is further configured for providing monitoring information to a manager.

According to a further embodiment, the monitoring controller is further configured for stopping the monitoring between the two hosts and for providing a result of the monitoring to the manager.

According to an embodiment, the application traffic is exchanged between virtualised applications, or wherein the application instances are virtualised applications.

According to yet an embodiment, the monitoring controller, the two application instances and the monitoring instance(s) correspond to individual containers, individual virtual machines or uni-kernels.

According to another embodiment, the monitoring controller is further configured for requesting resources to be reserved on the first host for a monitoring instance from a manager.

Figure 5:
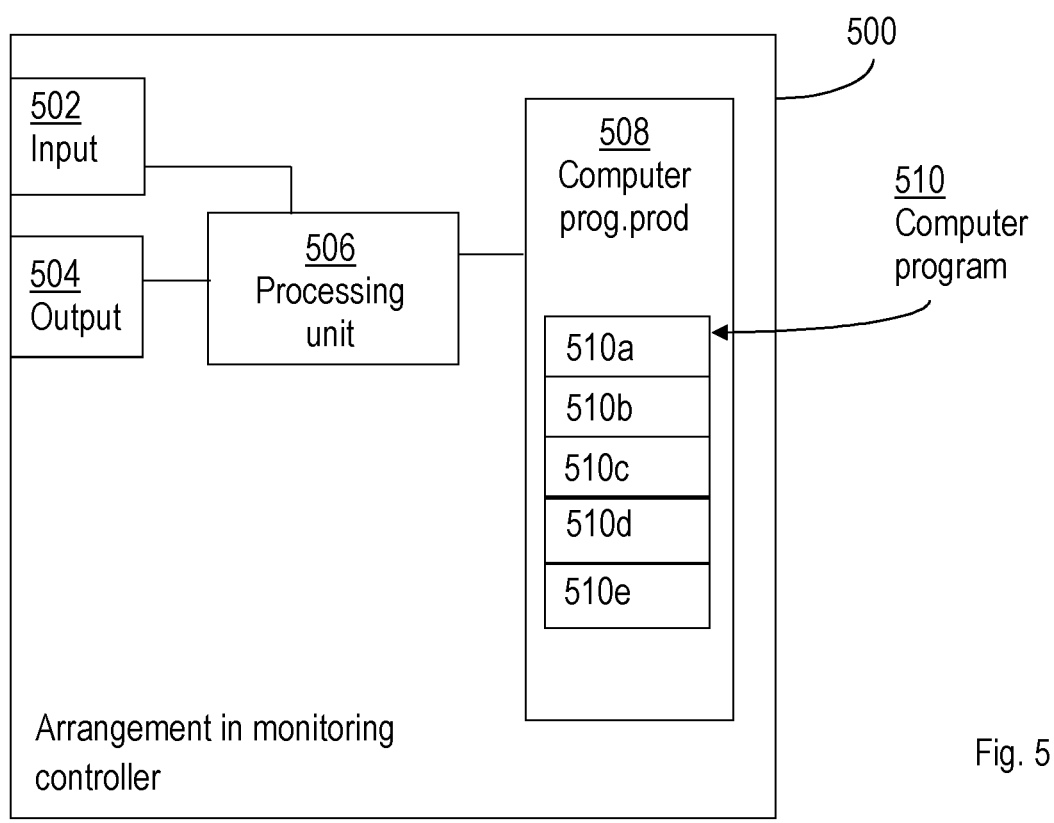
FIG. 5 is a block diagram of an arrangement in a monitoring controller for monitoring network performance, according to an exemplifying embodiment.

FIG. 5 schematically shows an embodiment of an arrangement 500 in a monitoring controller 400. Comprised in the arrangement 500 in the monitoring controller 400 are here a processing unit 506, e.g. with a Digital Signal Processor, DSP. The processing unit 506 may be a single unit or a plurality of units to perform different actions of procedures described herein. The arrangement 500 of the monitoring controller 400 may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement 500 in the monitoring controller 400 comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement 500 in the monitoring controller 400 causes the monitoring controller to perform the actions e.g. of the procedure described earlier in conjunction with FIGS. 1a-1d.

The computer program 510 may be configured as a computer program code structured in computer program modules 510a-510e. Hence, in an exemplifying embodiment, the code means in the computer program of the arrangement 500 in the monitoring controller 400 comprises a determining unit, or module, for determining a change in a communication between a first and a second application instance by observing application traffic exchanged between the first and second application instance, the first application instance being executed on the first host and the second application instance being executed on a second host. The computer program further comprises an initiating unit, or module, for initiating a monitoring instance in the first host for exchanging test packets between the first host and the second host for monitoring network performance.

The computer program modules could essentially perform the actions of the flow illustrated in FIGS. 1a-1d, to emulate the monitoring controller 400. In other words, when the different computer program modules are executed in the processing unit 506, they may correspond to the units 403-404 of FIG. 4.

Although the code means in the embodiments disclosed above in conjunction with FIG. 4 is implemented as computer program modules which when executed in the respective processing unit causes the monitoring controller to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the first host.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method for monitoring network performance, the method comprising receiving from a passive monitoring instance, by a monitoring controller of a first host, an indication of a change in a communication between a first application instance and a second application instance, wherein the passive monitoring instance observes application traffic exchanged between the first and second application instances, the first application instance being executed on the first host and the second application instance being executed on a second host, and wherein the monitoring controller corresponds to an individual container, individual virtual machine, or uni-kernel running on the first host;

determining if an active monitoring instance is running on the first host;

in response to the active monitoring instance not running on the first host, requesting an instantiation of the active monitoring instance from a management system to run on the first host;

determining if an active monitoring instance is running on the second host;

in response to the active monitoring instance not running on the second host, requesting the second host to run the active monitoring instance on the second host; and in response to the active monitoring instances running on both the first host and the second host, initiating, by the monitoring controller, an exchange of test packets between the active monitoring instances running on the first host and the second host for monitoring network performance.

2. The method according to claim 1, wherein the indication of the change in the communication between the two application instances is obtained by a notification of the change in the communication between the two application instances.

3. The method according to claim 1, further comprising receiving traffic exchanged between a first virtual application instance and a second virtual application instance, wherein the traffic is tapped from a virtual switch comprised in the first host.

4. The method according to claim 1, wherein the change comprises one or more of a new communication between the two application instances; that an existing, previously active communication having expired; a change in traffic intensity; a change in traffic pattern; and a change of communication protocol.

5. The method according to claim 1, further comprising determining that no previous monitoring is currently ongoing between the hosts with regard to the change, at least not with regard to a metric associated with the change in the communication between the first and the second application instances.

6. The method according to claim 1, wherein running the active monitoring instance in the first host comprises obtaining a software image required for starting one or more active monitoring instances in the first host.

7. The method according to claim 1, further comprising requesting a monitoring controller of the second host to initiate a corresponding active monitoring instance to run on the second host.

8. The method according to claim 1, wherein the application traffic is exchanged between virtualised applications, or wherein the two application instances are virtualised applications.

9. The method according to claim 8, wherein the two application instances and the active monitoring instances correspond to individual containers, individual virtual machines, or uni-kernels.

10. A non-transitory computer-readable storage medium, having stored thereon computer readable code which, when executed on a processor, causes a monitoring controller to perform operations for network performance comprising:

receiving from a passive monitoring instance, by a monitoring controller of a first host, an indication of a change in a communication between a first application instance and a second application instance, wherein the passive monitoring instance observes application traffic exchanged between the first and second application instances, the first application instance being executed on the first host and the second application instance being executed on a second host, and wherein the monitoring controller corresponds to an individual container, individual virtual machine or uni-kernel running on the first host;

determining if an active monitoring instance is running on the first host;

in response to the active monitoring instance not running on the first host, requesting an instantiation of the active monitoring instance from a management system to run on the first host;

determining if an active monitoring instance is running on the second host;

in response to the active monitoring instance not running on the second host, requesting the second host to run the active monitoring instance on the second host;

in response to the active monitoring instances running on both the first host and the second hosts, initiating, by the monitoring controller, an exchange of test packets between the active monitoring instances running on the first host and the second host for monitoring network performance.

11. A monitoring controller of a first host for monitoring network performance, the monitoring controller comprising:

a processor; and a memory containing instructions which, when executed by the processor, cause the monitoring controller to perform operations to:

receive from a passive monitoring instance, an indication of a change in a communication between a first application instance and a second application instance, wherein the passive monitoring instance observes application traffic exchanged between the first and second application instances, the first application instance being executed on the first host and the second application instance being executed on a second host, and wherein the monitoring controller initiates a monitoring controller process corresponding to an individual container, individual virtual machine or uni-kernel to run on the first host to perform the operations;

determine if an active monitoring instance is running on the first host;

in response to the active monitoring instance not running on the first host, request an instantiation of the active monitoring instance from a management system to run on the first host;

determine if an active monitoring instance is running on the second host;

in response to the active monitoring instance not running on the second host, request the second host to run the active monitoring instance on the second host; and in response to the active monitoring instances running on both the first host and the second host, initiate, by the monitoring controller process, an exchange of test packets between the active monitoring instances running on the first host and the second host for monitoring network performance.

12. The monitoring controller according to claim 11 further to request the monitoring controller of the second host to initiate a corresponding active monitoring instance to run on the second host.

13. The monitoring controller according to claim 11, wherein the application traffic is exchanged between virtualised applications, or wherein the two application instances are virtualised applications.

14. The monitoring controller according to claim 13, wherein the two application instances and the active monitoring instances correspond to individual containers, individual virtual machines or uni-kernels.

15. The monitoring controller according to claim 11 further to request resources to be reserved on the first host for the active monitoring instance from the management system.

16. The monitoring controller according to claim 11, wherein the indication of the change in the communication between the two application instances is obtained by a notification of the change in the communication between the two application instances.

17. The monitoring controller according to claim 11 further to receive traffic between the two application instances, wherein the traffic has been tapped from a virtual switch comprised in the first host.

18. The monitoring controller according to claim 11, wherein the change comprises one or more of a new communication between the two application instances; that an existing, previously active communication having expired; a change in traffic intensity; a change in traffic pattern; and a change of communication protocol.

19. The monitoring controller according to claim 11 further to determine that no previous monitoring is currently ongoing between the hosts with regard to the change, at least not with regard to a metric associated with the change in the communication between the first and the second application instances.

20. The monitoring controller according to claim 11 further to run the active monitoring instance in the first host by obtaining a software image required for starting one or more active monitoring instances in the first host.

* * * * *